(12) United States Patent
Kamio

(10) Patent No.: US 7,802,648 B2
(45) Date of Patent: Sep. 28, 2010

(54) VEHICLE WITH TILT DETECTION BASED ON FUEL GAUGE OUTPUT

(75) Inventor: Kunihiko Kamio, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 12/142,704

(22) Filed: Jun. 19, 2008

(65) Prior Publication Data
US 2008/0314674 A1    Dec. 25, 2008

(30) Foreign Application Priority Data
Jun. 22, 2007    (JP)    ............... 2007-165112

(51) Int. Cl.
*B60K 28/14*    (2006.01)
*G01F 23/32*    (2006.01)
(52) U.S. Cl. .................................. 180/283; 33/366.17
(58) Field of Classification Search .............. 180/283, 180/284, 285; 33/366.15, 366.17
See application file for complete search history.

(56) References Cited

U.S. PATENT DOCUMENTS 7,182,656 B2 *    2/2007    Nanami et al. ................. 440/1

FOREIGN PATENT DOCUMENTS

| FR | 2494649 A | * | 5/1982 |
| JP | 2003-176734 | | 6/2003 |
| KR | 98058528 A | * | 10/1998 |

* cited by examiner

*Primary Examiner*—Paul N Dickson
*Assistant Examiner*—Keith Frisby
(74) *Attorney, Agent, or Firm*—Alleman Hall McCoy Russell & Tuttle LLP

(57) ABSTRACT

A vehicle including an engine, a fuel tank configured to store a fuel supplied to the engine, a fuel gauge configured to detect a fuel level of the fuel inside the fuel tank, and a tilting detector configured to determine whether or not a body of the vehicle is tilted, based on a signal output from the fuel gauge.

6 Claims, 17 Drawing Sheets

VEHICLE WITH TILT DETECTION BASED ON FUEL GAUGE OUTPUT

TECHNICAL FIELD

The present invention relates to a vehicle which is capable of detecting tilting of the vehicle, such as a jet-propulsion personal watercraft (PWC), a three-wheeled or four-wheeled all terrain vehicle, or a motorcycle.

BACKGROUND ART

In conventional fuel injection systems (FI systems), a fuel injector injects a predetermined amount of fuel into an air-intake passage connected to an engine under control of an ECU (electronic control unit). In some vehicles including such FI systems, the ECU causes the fuel injector to stop fuel injection to forcibly stop running of the engine, when a tilting sensor detects that a body thereof is tilted a specified angle or larger.

Typically, the tilting sensor is positioned in the vicinity of a center of gravity of the body to precisely detect that the body is tilted. In the vicinity of the center of gravity of the body, relatively bulky components such as the engine, a fuel tank, and an air cleaner box are disposed. If the tilting sensor is positioned in the vicinity of the center of gravity of the body, space for the other components is reduced, requiring volumes of the other components to be smaller or have intricate shapes. Generally, tilting of the vehicle occurs infrequently, and therefore the tilting sensor is activated infrequently. For these reasons, it is undesirable for the tilting sensor to occupy the space in the vicinity of the center of gravity of the body. In addition, brackets and electric wire are needed to mount the tilting sensor in the vehicle, increasing structural members, the number of components, and the overall manufacturing cost of the vehicle.

SUMMARY OF THE INVENTION

The present invention addresses the above described conditions, and an object of the present invention is to provide a vehicle which is capable of detecting that a body of the vehicle is tilted by efficiently utilizing a body space of the vehicle without increasing components and a manufacturing cost.

According to the present invention, there is provided a vehicle comprising an engine; a fuel tank configured to store a fuel supplied to the engine; a fuel gauge configured to detect a fuel level of the fuel inside the fuel tank; and a tilting detector configured to determine whether or not a body of the vehicle is tilted, based on a signal output from the fuel gauge.

In such a configuration, when the body of the vehicle is tilted and the fuel tank changes its posture, the fuel gauge changes its posture and outputs a signal different from that in a normal state. By monitoring the signal output from the fuel gauge, it can be determined whether or not the body of the vehicle is tilted. So, a tilting sensor for exclusive use may be omitted. Therefore, the space which would be occupied by the tilting sensor can be efficiently used for other components. Furthermore, since brackets or electric wires for the tilting sensor are omitted, the number of components and manufacturing cost of the vehicle can be reduced.

The tilting detector may be configured to determine that the body of the vehicle is tilted, when a change amount per unit time of the signal output from the fuel gauge is a predetermined value or larger.

In such a configuration, when the body of the vehicle is tilted, the fuel tank changes its posture with a large angle, and the fuel amount detected by the fuel gauge changes significantly. Therefore, it can be determined that the body of the vehicle is tilted when the change amount of the signal output from the fuel gauge is the predetermined value or larger.

The tilting detector may be configured to determine that the body of the vehicle is tilted, when the signal output from the fuel gauge changes according to a predetermined pattern which indicates a change in a fuel amount occurring when the body is tilted.

In such a configuration, the predetermined pattern of the signal output from the fuel gauge when the body of the vehicle is tilted, is researched and pre-set, and it can be determined that the body of the vehicle is tilted when the change in the signal of the fuel gauge conforms to the predetermined pattern.

The fuel gauge may include a float disposed inside the fuel tank, and a float movement detector configured to be able to detect a movement or position of the float.

In such a configuration, when the body of the vehicle is tilted, and the position of the fuel level with respect to the fuel tank changes significantly, the position of the float changes significantly. So, the float movement detector detects a movement of the float different from that in the normal state. Therefore, by monitoring the signal output from the float movement detector, it can be detected whether or not the body of the vehicle is tilted.

The float movement detector may include a pivot lever coupled to the float and a lever angle detector configured to detect an angle of the pivot lever. The pivot lever may be oriented in a lateral direction of the vehicle.

In such a configuration, the change in the fuel level resulting from the tilting of the body in the lateral direction can be precisely detected by detecting the fuel amount based on the angle of the pivot lever coupled to the float, because the pivot lever is oriented in the lateral direction of the vehicle.

The vehicle may further comprise a fuel amount display device configured to display a fuel amount of the fuel. The fuel gauge may be configured to output to the fuel amount display device, a signal indicating a fuel level of the fuel as fuel amount information.

In such a configuration, since the fuel gauge for displaying the fuel amount information in the fuel amount display device is used to detect whether or not the body of the vehicle is tilted, the number of components and manufacturing cost of the vehicle can be reduced.

The vehicle may further comprise an engine controller configured to stop the engine, when the tilting detector detects that the body of the vehicle is tilted.

In such a configuration, when it is detected that the body of the vehicle is tilted, the engine running undesirably can be forcibly stopped.

The vehicle may further comprise a tilting restoration detector configured to detect that the body of the vehicle is returned from a tilted state to an untilted state, based on the signal output from the fuel gauge. The engine controller may be configured to enable the engine to be started, when the tilting restoration detector detects that the body of the vehicle is returned from the tilted state to the untilted state.

In such a configuration, when the body of the vehicle is returned from the tilted state to the untilted state, the engine is allowed to start. This makes it possible to start driving in a short time after the body of the vehicle has been tilted.

The vehicle may further comprise a power supply switch, which is operated by a user to supply an electric power to the engine controller; a start-up input device which is operated by the user to start the engine; and a tilting restoration detector configured to detect that the body of the vehicle is returned from the tilted state to the untilted state, based on the signal output from the fuel gauge. The engine controller may be configured to stop the engine, when the tilting detector detects that the body of the vehicle is tilted, and to start the engine in response to an operation of the start-up input device performed by the user after the power supply switch is reset by the user, after stopping the engine. The engine controller may be configured to enable the engine to be started in response to the operation of the start-up input device performed by the user without resetting the power supply switch, when the tilting restoration detector detects that the body of the vehicle is returned from the tilted state to the untilted state.

In such a configuration, when the user returns the posture of the vehicle from the tilted state to the untilted state, the user has only to operate the start-up input device to start the engine without resetting the power supply switch. Therefore, it becomes possible to start driving in a short time after the body of the vehicle has been tilted. On the other hand, in the state where the body of the vehicle is tilted, the engine cannot be started unless the start-up input device is operated after the power supply switch is reset. This makes it possible to inhibit the engine from being started in the state where the body of the vehicle is tilted.

The above and further objects and features of the invention will more fully be apparent from the following detailed description with accompanying drawings.

DETAILED DESCRIPTION OF THE PREFERRED EMBODIMENTS

Hereinafter, embodiments of the present invention will be described with reference to the accompanying drawings. As used herein, the directions are referenced from a perspective of a user (not shown) straddling a jet-propulsion personal watercraft.

Embodiment 1

Figure 1:
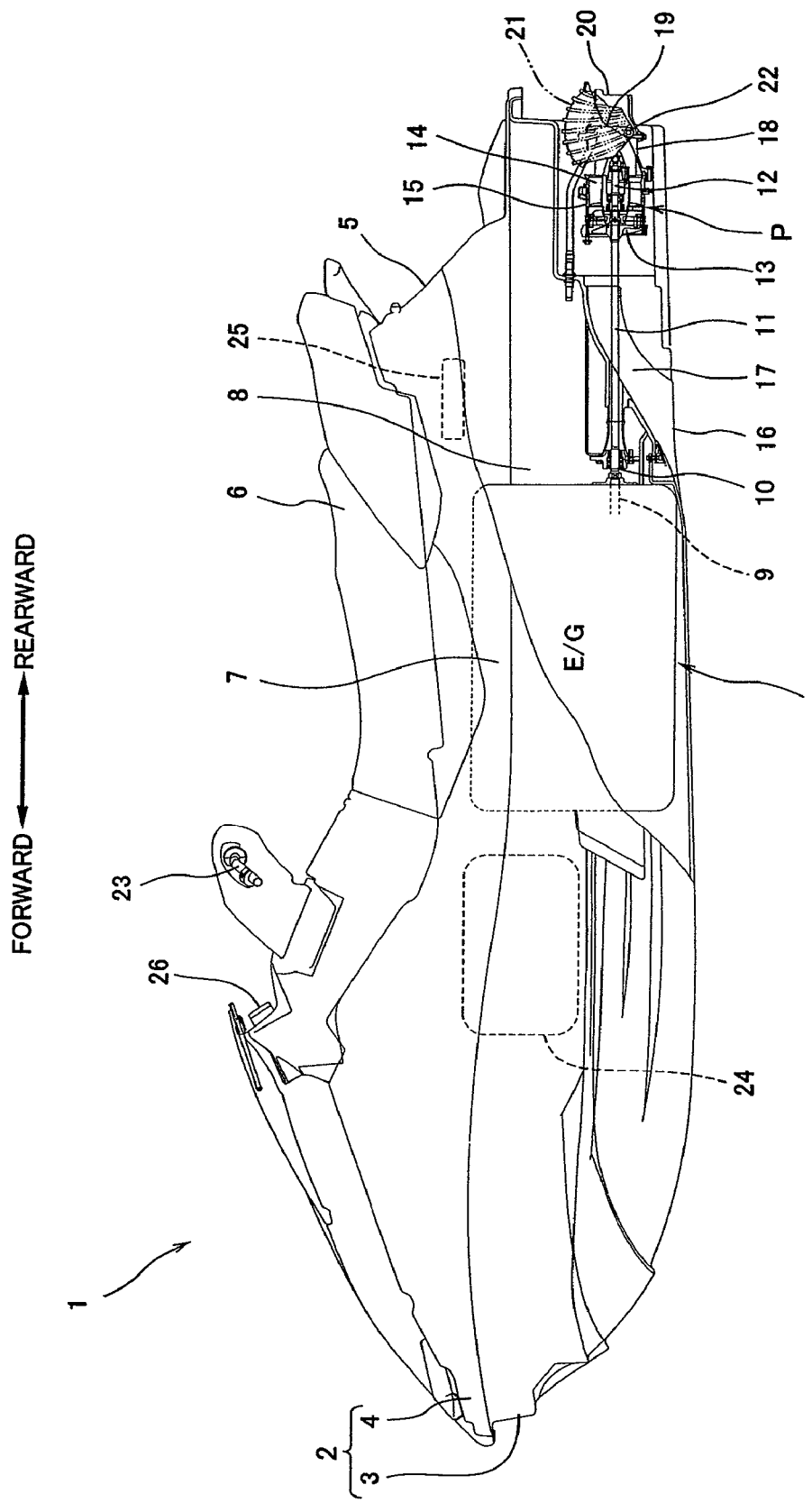
FIG. 1 is a left side view of a jet-propulsion personal watercraft according to a first embodiment of the present invention.

FIG. 1 is a left side view of a jet-propulsion personal watercraft 1 according to a first embodiment of the present invention. With reference to FIG. 1, the jet-propulsion personal watercraft 1 is a straddle-type jet-propulsion personal watercraft which is provided with a seat 6 straddled by a user. A body 2 of the watercraft 1 comprises a hull 3 and a deck 4 covering the hull 3 from above. A center portion (protruding portion) 5 in a width direction of a rear part of the deck 4 protrudes upward. The seat 6 is mounted over an upper surface of the protruding portion 5. A deck floor 7 is formed on right and left sides in the width direction of the protruding portion 5 to be substantially flat and lower than the protruding portion 5 to enable user's feet to be put thereon.

In an inner space 8 defined by the hull 3 and the deck 4 below the seat 6, an engine E is disposed in a center of gravity of the body 2. The engine E is mounted in the engine room 8 in such a manner that a crankshaft 9 extends in a longitudinal direction of the body 2. An output end portion of the crankshaft 9 is coupled to a propeller shaft 11 via a coupling member 10. A water jet pump P is disposed in a center position of a lateral direction of the body 2 at a rear part of the hull 3. The propeller shaft 11 is coupled to a pump shaft 12 of the water jet pump P. The pump shaft 12 is rotatable in association with the rotation of the crankshaft 9. An impeller 13 is attached on the pump shaft 12 and fairing vanes 14 are provided behind the impeller 13. A tubular pump casing 15 is provided on the outer periphery of the impeller 13 so as to contain the impeller 13.

A water intake 16 opens in a bottom region of the body 2. The water intake 16 is connected to the pump casing 15 through a water passage 17. The pump casing 15 is coupled to a pump nozzle 18 provided on the rear side of the body 2. The pump nozzle 18 has a cross-sectional area that gradually reduces rearward, and an outlet port 19 opens at a rear end of the pump nozzle 18. A steering nozzle 20 is coupled to the outlet port 19 of the pump nozzle 18 and is configured to be pivotable clockwise and counterclockwise.

Water outside the watercraft 1 is sucked from the water intake 16 on the bottom region of the hull 3 and fed to the water jet pump P. Driven by the engine E, the water jet pump P causes the impeller 13 to be rotated, thereby pressurizing and accelerating the water. The fairing vanes 14 guide water flow behind the impeller 13. A water jet is ejected rearward from the outlet port 19 of the pump nozzle 18 and through the steering nozzle 20. As the resulting reaction, the watercraft 1 obtains a propulsion force. A bowl-shaped reverse deflector 21 is provided on an upper portion of the steering nozzle 20 such that it is vertically pivotable around a horizontally mounted pivot shaft 22.

A bar-type steering handle 23 is disposed in front of the seat 6. The steering handle 23 is connected to the steering nozzle 20 through a steering cable (not shown). When the user rotates the steering handle 26 clockwise or counterclockwise, the steering nozzle 20 is pivoted toward the opposite direction, so that the ejection direction of the water being ejected through the steering nozzle 20 can be changed, and the watercraft 1 can be correspondingly turned to any desired direction while the water jet pump P is generating the propulsion force.

A fuel tank 24 is disposed forward of the engine E. The fuel tank 24 serves to store a fuel supplied to the engine E. A meter unit 26 is disposed in front of the steering handle 23 to display a vehicle speed, an engine speed, or a fuel amount. The meter unit 26 serves as a fuel amount display device. An ECU (electronic control unit) 25 is mounted behind the engine E to control the engine E.

Figure 2:
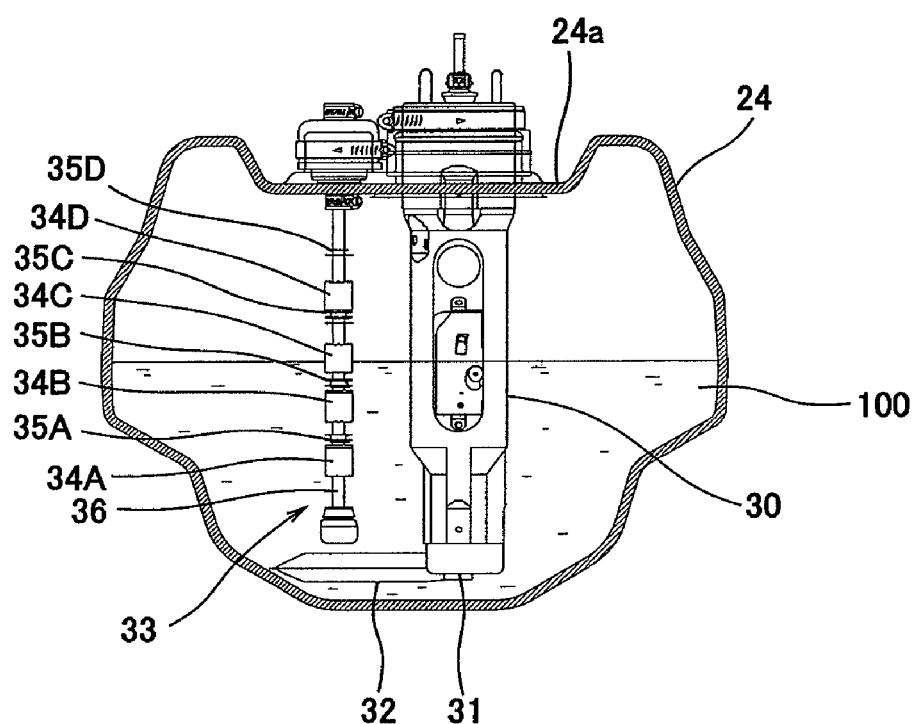
FIG. 2 is a cross-sectional view of a fuel tank of the jet-propulsion personal watercraft of FIG. 1, as viewed from the rear.

FIG. 2 is a cross-sectional view of the fuel tank 24 in the jet-propulsion personal watercraft 1 of FIG. 1, as viewed from the rear. As shown in FIG. 2, a fuel pump 30 is attached to an upper wall portion 24a of the fuel tank 24. The fuel pump 30 extends downward inside the fuel tank 24. A suction port 31 is provided at a lower end portion of the fuel pump 30. A mesh-shaped filter 32 is attached to protrude from the suction port 31. The fuel pump 30 suctions a fuel 100 inside the fuel tank 24 from the suction port 31 via the filter 32. A fuel injector (not shown) injects the fuel 100 into an air-intake passage connected to the engine E (FIG. 1).

A fuel gauge 33 is attached to the upper wall portion 24a of the fuel tank 24. The fuel gauge 33 extends downward inside the fuel tank 24. The fuel gauge 33 is configured to measure a distance from a predetermined measurement reference point to a fuel level of the fuel 100. The fuel gauge 33 is positioned slightly leftward with respect to a center in a lateral direction of the fuel tank 24. The fuel gauge 33 includes a vertical shaft 36, four floats 34A to 34D attached to the vertical shaft 36 to be spaced apart from each other, and float movement detecting switches (float movement detectors) 35A to 35D provided to respectively to correspond to the floats 34A to 34D. The vertical shaft 36 is provided with four slide grooves which are spaced apart from each other so as to respectively correspond to the four floats 34A to 34D. The floats 34A to 34D are each vertically slidable by a slight amount.

When the floats 34A to 34D slide upward and contact the float movement detecting switches 35A to 35D, the switches 35A to 35D are turned on, while when the floats 34A to 34D slide downward away from the float movement detecting switches 35A to 35D, the switches 35A to 35D are turned off. For example, in the state shown in FIG. 2, when the floats 34A and 34B immersed in the fuel 100 inside the fuel tank 24 slide upward by a buoyant force and contact the float movement detecting switches 35A and 35B, the switches 35A and 35B are turned on. On the other hand, when the floats 34C and 34D which are not immersed in the fuel 100 inside the fuel tank 24 slide downward away from the float movement detecting switches 35C and 35D by a gravitational force, the switches 35C and 35D are turned off. Thus, the float movement detecting switches 35A to 35D enable the ECU 25 to detect five levels of the fuel, namely, FULL, HIGH, MIDDLE, LOW, and EMPTY. Thus, the ECU 25 detects a fuel amount inside the fuel tank 24.

Figure 3:
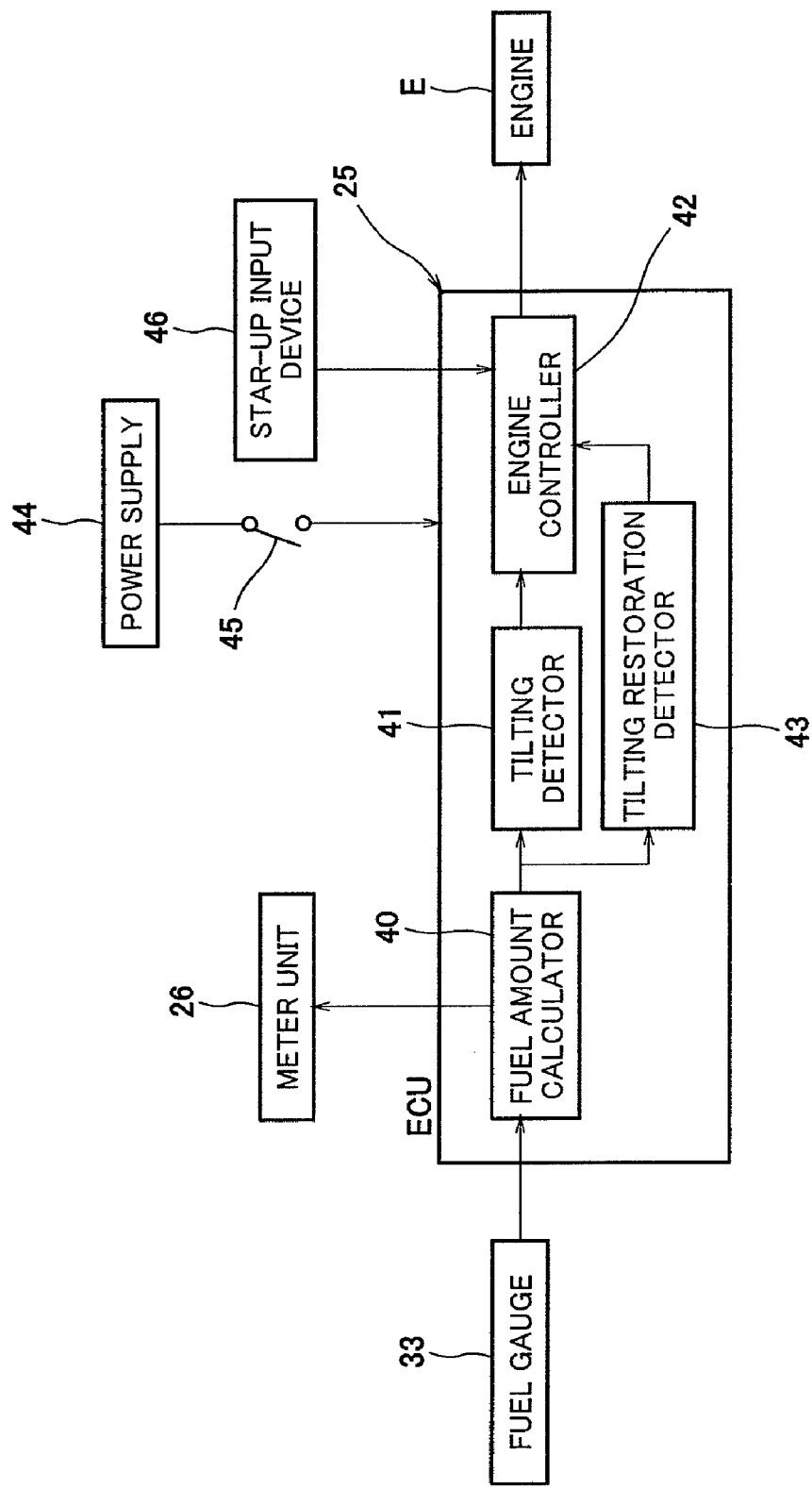
FIG. 3 is a block diagram showing major components of the jet-propulsion personal watercraft of FIG. 1.

FIG. 3 is a block diagram showing major components of the jet-propulsion personal watercraft 1 of FIG. 1. As shown in FIG. 3, the fuel gauge 33 is communicatively coupled to the ECU 25, which is in turn coupled to the engine E. The ECU 25 includes a fuel amount calculator 40, a tilting detector 41, an engine controller 42, and a tilting restoration detector 43. The fuel amount calculator 40 is configured to detect the fuel level of the fuel 100 based on a state of the float movement detecting switches 35A to 35D (FIG. 2) of the fuel gauge 33, thereby calculating a fuel amount. To be specific, the fuel amount calculator 40 determines that the fuel amount is larger when the number of the float movement detecting switches 35A to 35D, which are in on-states, is larger, whereas the fuel amount calculator 40 determines that the fuel amount is smaller when the number of the float movement detecting switches 35A to 35D, which are in on-states, is smaller. The fuel amount information calculated by the fuel amount calculator 40 is output to the meter unit 26, which displays the fuel amount in a fuel amount display section (not shown) thereof to present information of the fuel amount to the user.

The fuel detector 41 is configured to detect a tilted state of the body 2 of the watercraft 1 based on the fuel amount calculated by the fuel amount calculator 40. To be specific, the tilting detector 41 determines that the body 2 of the watercraft 1 is tilted clockwise or counterclockwise, when a change amount per specified unit time of the fuel amount calculated by the fuel amount calculator 40 is a predetermined value or larger. The predetermined value is set larger than a fuel consumption change amount associated with driving and a fuel increase amount caused by supplying the fuel. The engine controller 42 is configured to forcibly stop the engine E when the tilting detector 41 detects that the body 2 of the watercraft 1 is tilted. The tilting restoration detector 43 is configured to detect that the user or other person returns the body 2 of the watercraft 1 (FIG. 1) from a tilted state to an untilted state, based on the fuel amount calculated by the fuel amount calculator 40.

A power supply 44 is coupled to the ECU 25. A power supply switch 45 is turned on and off by the user to allow and not to allow an electric power to be supplied from the power supply 44 to the ECU 25. The power supply switch 45 is activated when the user inserts a key (not shown) into a key cylinder (not shown) located in the vicinity of the steering handle 23 and rotates the key. A start-up input device 46 which is a starter switch, is provided in the vicinity of the steering handle 23 (FIG. 1). In response to the user's operation of start-up input device 46, the engine controller 42 starts the engine E.

Figure 4:
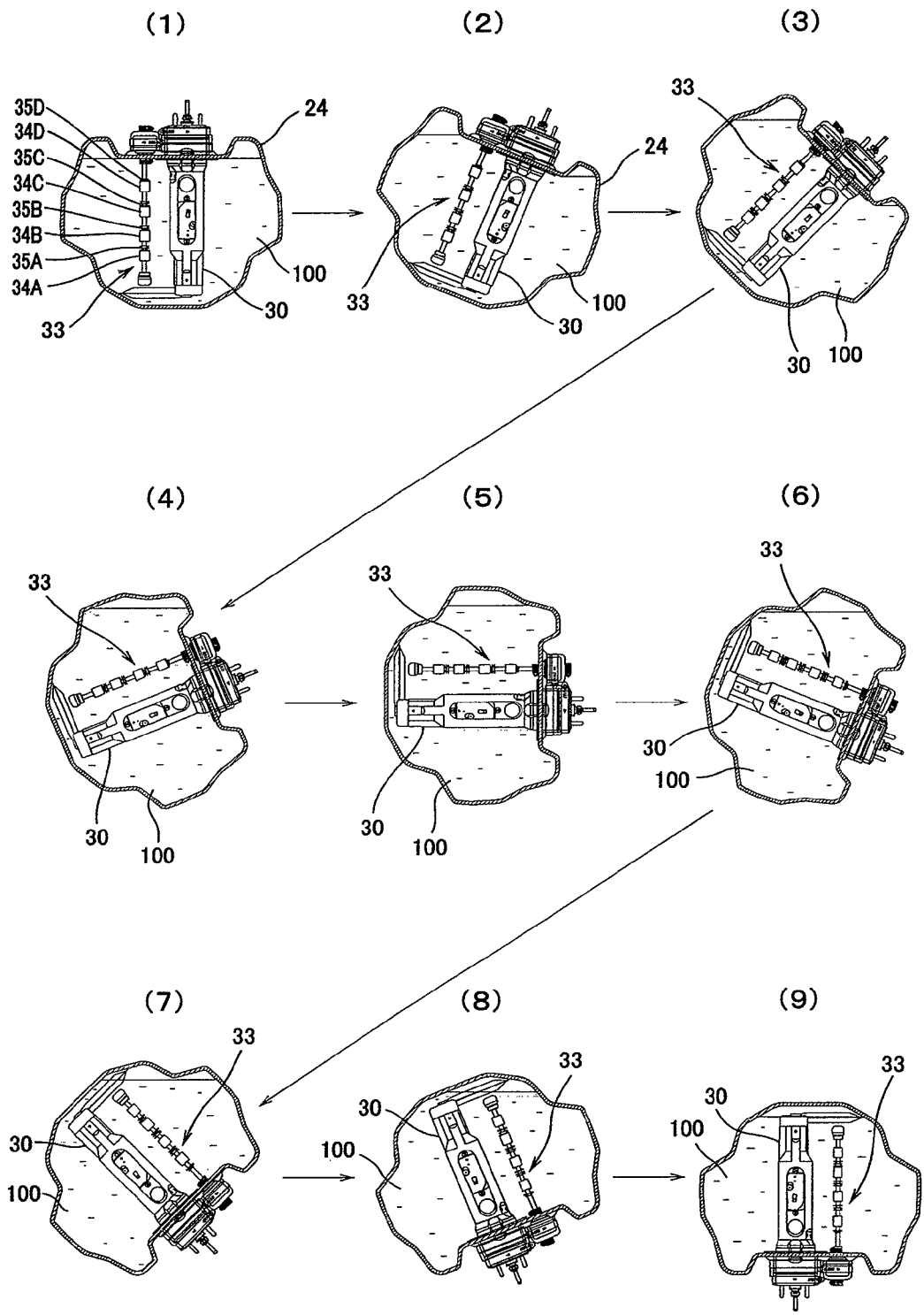
FIG. 4 is a cross-sectional view showing how a fuel tank which stores a fuel at a full level is moved when a body of the vehicle is tilted.
Figure 5:
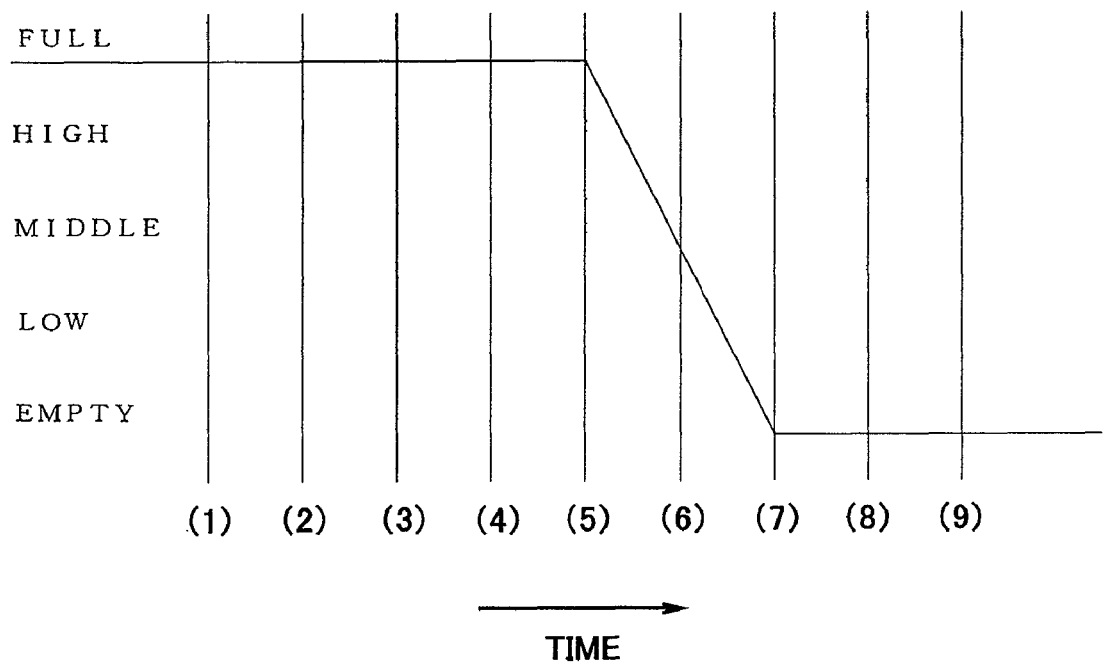
FIG. 5 is a graph showing a signal output from a fuel gauge when the body of the vehicle is tilted as shown in FIG. 4.

FIG. 4 is a cross-sectional view showing how the fuel tank 24, which stores the fuel at a full level, is moved when the body 2 of the watercraft 1, is tilted. FIG. 5 is a graph showing a signal output from the fuel gauge 33 when the body 2 is tilted as shown in FIG. 4. As shown in FIG. 4, when the body 2 of the watercraft 1 is tilted and inverted clockwise 180 degrees, the fuel tank 24 is rotated clockwise 180 degrees from a state (1) to a state (9). In this case, also, the fuel gauge 33 is rotated clockwise 180 degrees from the state (1) to the state (9). Accordingly, the fuel gauge 33 outputs the signal changing as shown in FIG. 5.

In the state (1) to the state (5) in FIG. 4, the floats 34A to 34D move by the buoyant force and contact the float movement detecting switches 35A to 35D, and thereby the switches 35A to 35D are turned on. Therefore, the fuel gauge 33 outputs a signal FULL indicating that the fuel amount of the fuel 100 is at a full level. In the state (6) to the state (9) in FIG. 4, the floats 34A to 34D move by the buoyant force away from the float movement detecting switches 35A to 35D, and thereby the switches 35A to 35D are turned off. Therefore, the fuel gauge 33 outputs a signal EMPTY indicating that the fuel amount of the fuel 100 is at an empty level. Thereafter, the fuel gauge 33 continues to output the signal EMPTY. That is, when the body 2 of the watercraft 1 is tilted and inverted clockwise 180 degrees in the state where the fuel amount of the fuel 100 inside the fuel tank 24 is at the full level, the fuel gauge 33 outputs the signal changing in four levels from FULL to EMPTY per specified unit time (e.g., five seconds).

Figure 6:
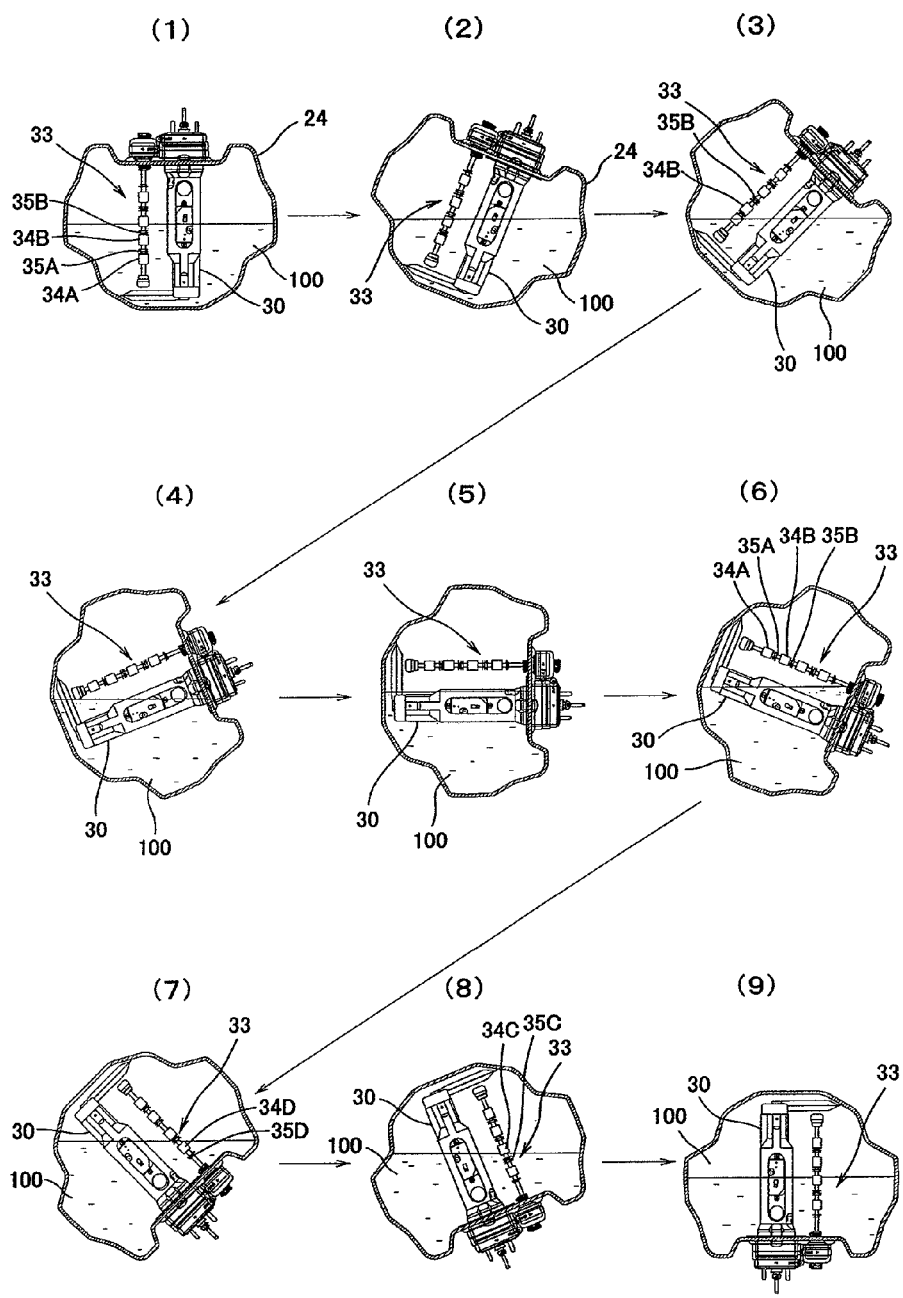
FIG. 6 is a cross-sectional view showing how the fuel tank which stores the fuel at a middle level is moved when the body of the vehicle is tilted.
Figure 7:
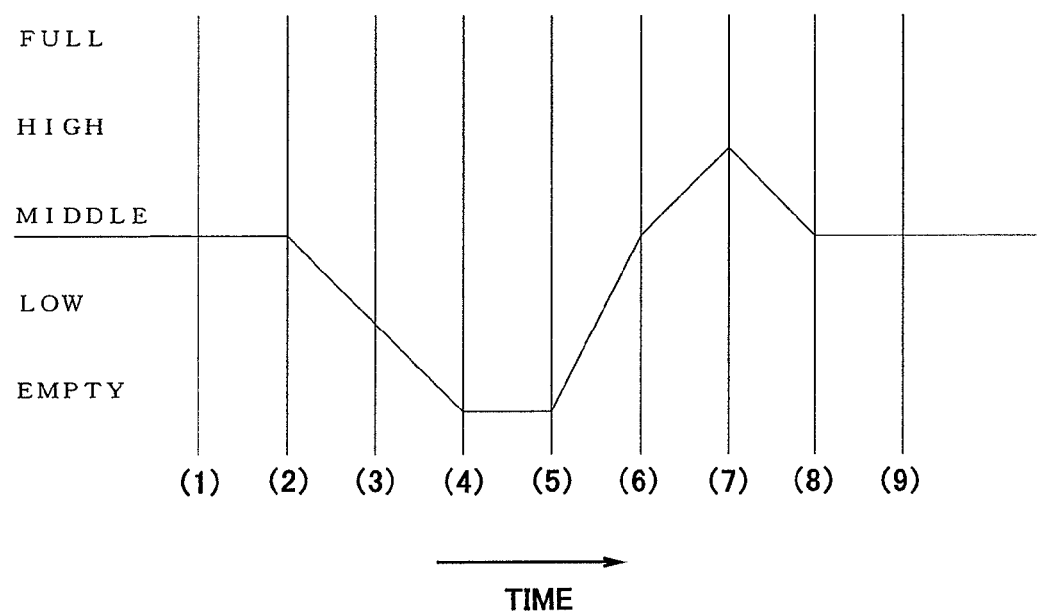
FIG. 7 is a graph showing a signal output from the fuel gauge when the body of the vehicle is tilted as shown in FIG. 6.

FIG. 6 is a cross-sectional view showing how the fuel tank 24, which stores the fuel 100 at a middle level, is moved when the body 2 of the watercraft 1 is tilted. FIG. 7 is a graph showing a signal output from the fuel gauge 33 when the body 2 is tilted as shown in FIG. 6. As shown in FIG. 6, when the body 2 of the watercraft 1 is tilted and inverted clockwise 180 degrees, the fuel tank 24 is rotated clockwise 180 degrees from a state (1) to a state (9). In this case, also, the signal output from the fuel gauge 33 which is being tilted and inverted changes as shown in FIG. 7.

To be specific, in the state (1) and the state (2) in FIG. 6, the floats and 34B move by the buoyant force and contact the float movement detecting switches 35A and 35B, and thereby the switches 35A and 35B are turned on. Therefore, the fuel gauge 33 outputs a signal MIDDLE indicating that the fuel amount of the fuel 100 is at a middle level. In the state (3) in FIG. 6, the float 34B moves out of the fuel 100 and away from the float movement detecting switch 35B by the gravitational force, and thereby the switch 34B is turned off. Therefore, the fuel gauge 33 outputs a signal LOW indicating that the fuel amount of the fuel 100 is at a low level. In the state (4) and the state (5) in FIG. 6, all the floats 34A to 34D move out of the fuel 100 and away from the float movement detecting switches 35A to 35D by the gravitational force, and thereby the switches 35A to 35D are turned off. Therefore, the fuel gauge 33 outputs the signal EMPTY indicating that the fuel amount of the fuel 100 is at the empty level.

In the state (6) in FIG. 6, the floats 34A and 34B move by the gravitational force and contact the float movement detecting switches 35A and 35B, and thereby the switches 35A and 35B are turned on. Therefore, the fuel gauge 33 outputs the signal MIDDLE indicating that the fuel amount of the fuel 100 is at the middle level. In the state (7) in FIG. 6, only the float 34D moves by the buoyant force away from the float movement detecting switch 35D, and thereby the switch 35D is turned off. Therefore, the fuel gauge 33 outputs the signal HIGH indicating that the fuel amount of the fuel 100 is at the high level. In the state (8) and the state (9) in FIG. 6, the float 34C moves by the buoyant force away from the float movement detecting switch 35C and thereby the switch 35C is turned off. Thereby, the fuel gauge 33 outputs the signal MIDDLE indicating that the fuel amount of the fuel 100 is at the middle level.

As should be appreciated from above, when the body 2 of the watercraft 1 is tilted and inverted clockwise 180 degrees in the state where the fuel amount of the fuel 100 is at the middle level, the fuel gauge 33 outputs the signal changing from MIDDLE to EMPTY, from EMPTY to HIGH, and HIGH to MIDDLE per specified unit time (e.g., five seconds). That is, the fuel gauge 33 outputs the signal changing in three levels from EMPTY to HIGH.

Figure 8:
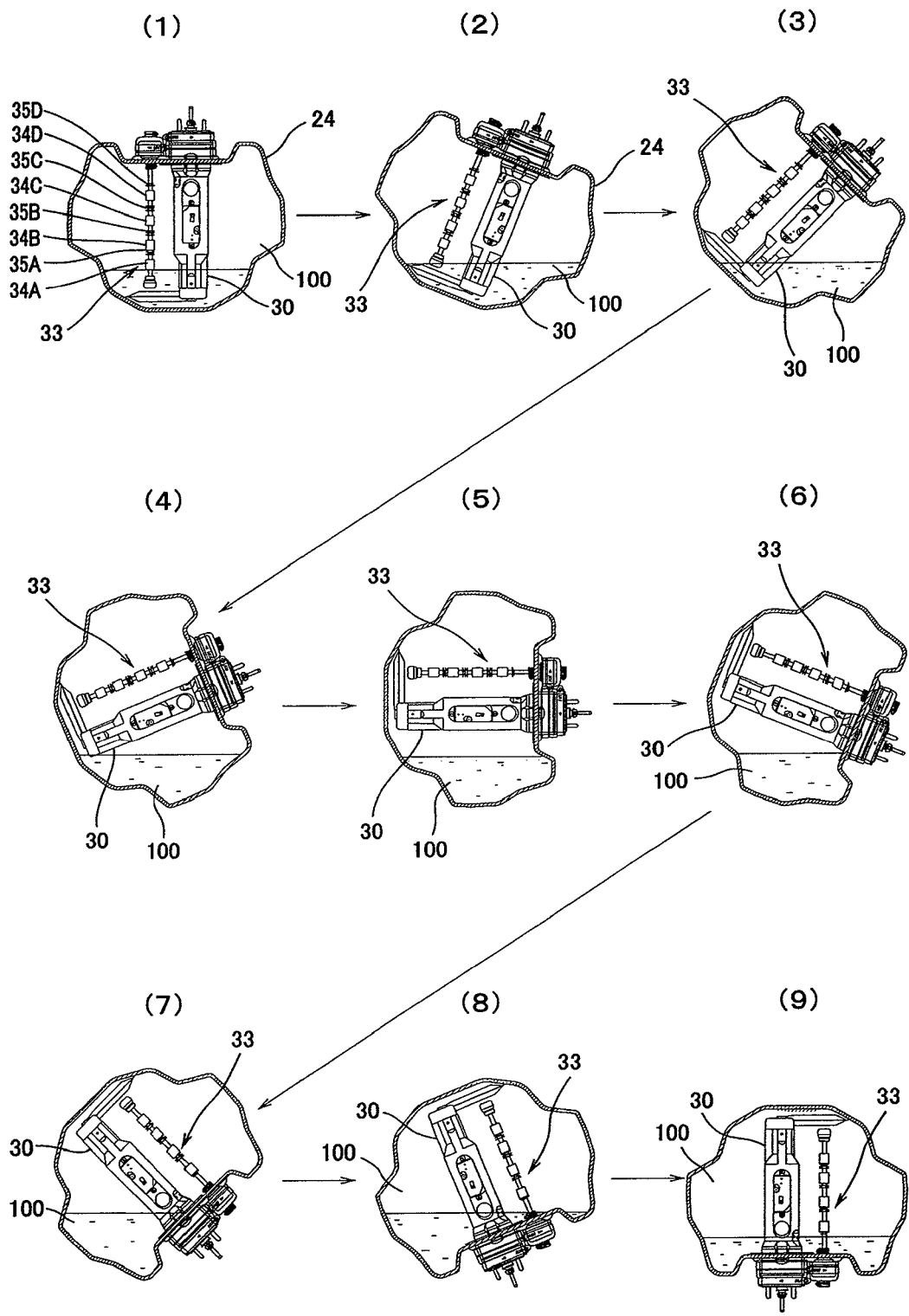
FIG. 8 is a cross-sectional view showing how the fuel tank which is empty is moved when the body of the vehicle is tilted.
Figure 9:
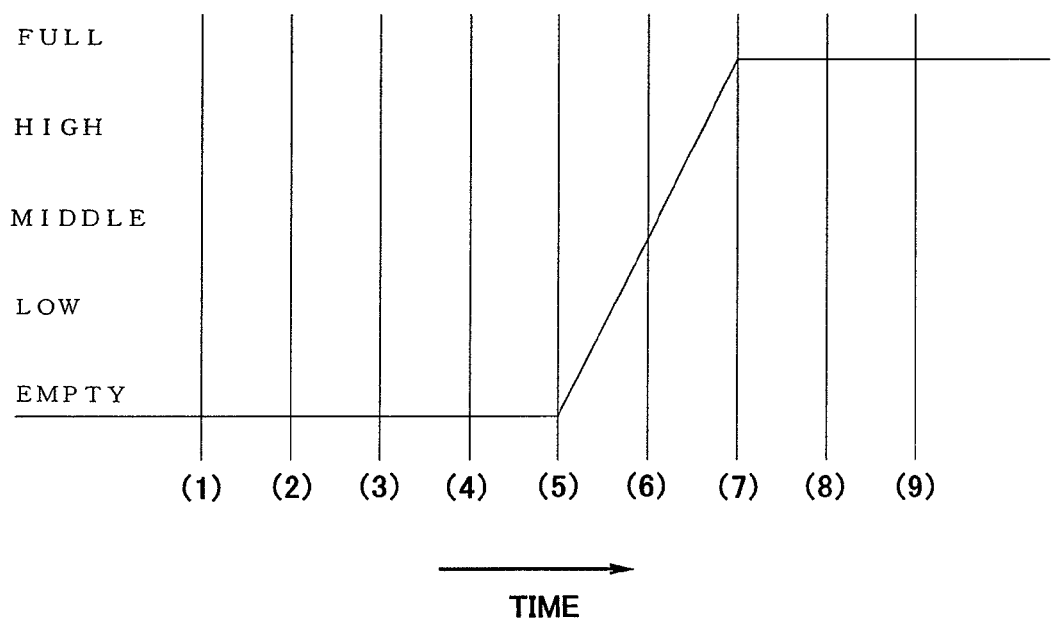
FIG. 9 is a graph showing a signal output from the fuel gauge when the body of the vehicle is tilted as shown in FIG. 8.

FIG. 8 is a cross-sectional view showing how the fuel tank 24 in which the fuel amount is empty is moved when the body 2 of the watercraft 1 is tilted. FIG. 9 is a graph showing a signal output from the fuel gauge 33 when the body 2 of the vehicle 1 is tilted as shown in FIG. 8. As shown in FIG. 8, when the body 2 of the watercraft 1 is tilted and inverted clockwise 180 degrees, and the fuel tank 24 is rotated clockwise 180 degrees from a state (1) to a state (9), the fuel gauge 33 outputs a signal changing as shown in FIG. 9.

In the state (1) to the state (5) in FIG. 8, all the floats 34A to 34D move away from the float movement detecting switches 35A to 35D by the gravitational force and thereby the switches 35A to 35D are turned off. Therefore, the fuel gauge 33 outputs the signal EMPTY, indicating that the fuel amount of the fuel 100 is at the empty level. In the state (6) to the state (9) in FIG. 8, the floats 34A to 34D move by the buoyant force away from the float movement detecting switches 35A to 35D, and thereby switches 35A to 35D are turned off. Therefore, the fuel gauge 33 outputs the signal FULL, indicating that the fuel amount of the fuel 100 is at the full level. Thereafter, the fuel gauge 33 continues outputting the signal FULL. That is, when the body 2 of the watercraft 1 is tilted and inverted clockwise 180 degrees, the fuel gauge 33 outputs the signal changing in four levels from EMPTY to FULL per specified unit time (e.g., five seconds).

As described above with reference to FIGS. 4 to 9, when the body 2 of the watercraft 1 is tilted and the fuel tank 24 changes its posture, the liquid level of the fuel 100 with respect to the fuel tank 24 changes significantly, and the signal output from the fuel gauge 33 changes significantly, unlike the normal state. Therefore, when the change amount of the signal output from the fuel gauge 33 per specified unit time is the predetermined value or larger, for example, the change amount is three levels or larger in five levels, the tilting detector 41 determines that the body 2 of the watercraft 1 is tilted. In an alternative example, the tilting detector 41 may be configured to pre-store patterns (e.g., patterns shown in FIGS. 5, 7, and 9) of the signal output from the fuel gauge 33 when the body 2 is tilted, and to determine that the body 2 is tilted when the signal output from the fuel gauge 33 changes as shown in FIG. 5, FIG. 7 or FIG. 9. In this case, the pattern of the signal output from the fuel gauge 33 may indicate how the fuel amount changes with a lapse of time. To be specific, the tilting detector 41 is configured to store for each level of fuel amount, the pattern of the signal output from the fuel gauge 33 when the body 2 is tilted. The tilting detector 41 may be configured to determine that the body 2 is tilted when a pattern of the signal output from the gauge 33 indicates that the body 2 is tilted and the fuel amount corresponding to that pattern coincides with the fuel amount just before the fuel amount changes. This makes it possible to reduce false detection.

Figure 10:
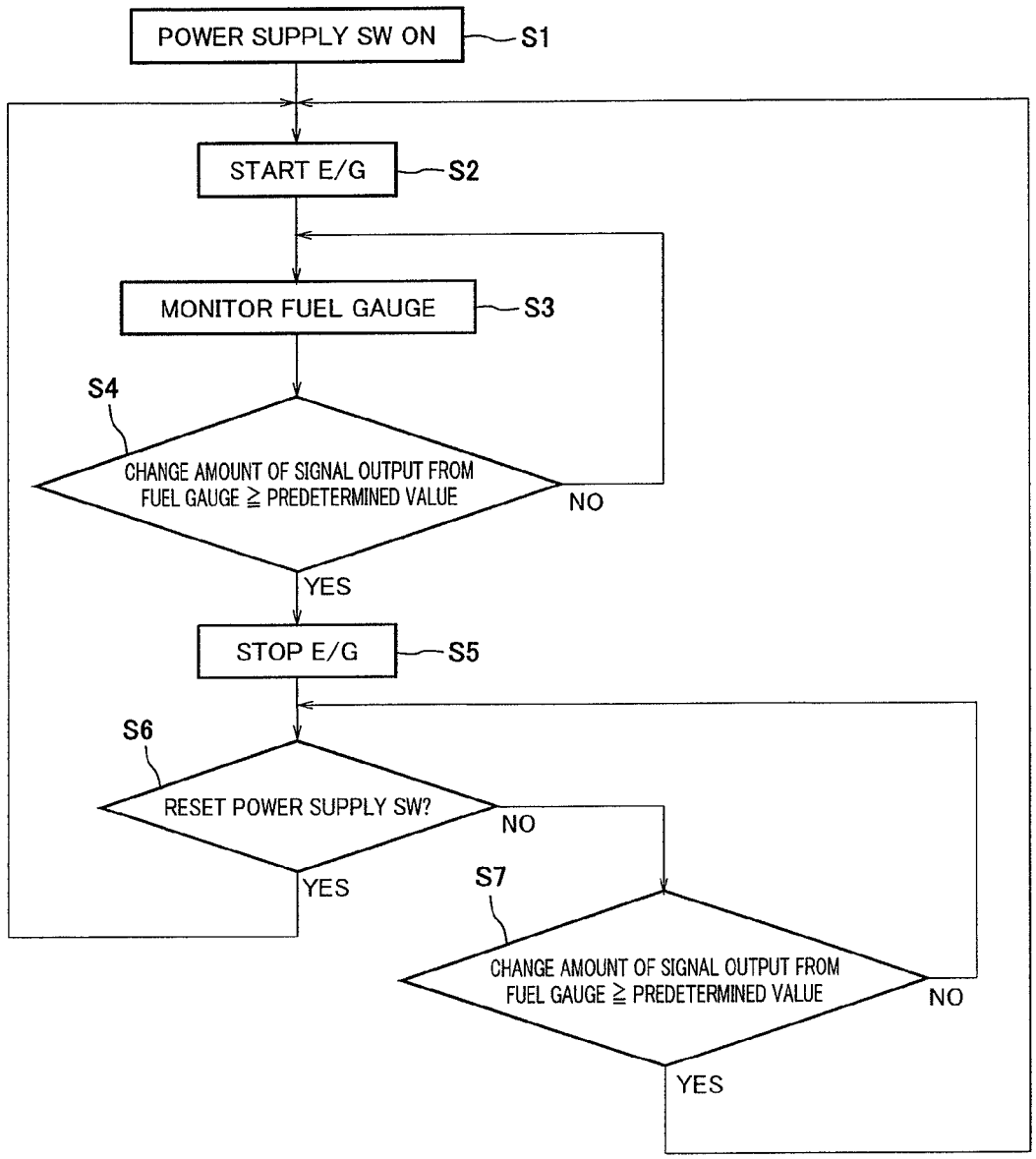
FIG. 10 is a flowchart showing a procedure for detecting that the body is tilted, in the jet-propulsion personal watercraft of FIG. 1.

Subsequently, a procedure for detecting that the body 2 of the watercraft 1 is tilted will be described with reference to the configuration of FIG. 3 and the flowchart of FIG. 10. FIG. 10 is a flowchart showing the procedure for detecting that the body 2 is tilted in the watercraft 1 of FIG. 1. Initially, the user turns on the power supply switch 45 (step S1), and operates the start-up input device 46 to start the engine E (step S2). Then, the tilting detector 41 of the ECU 25 monitors continuously the signal output from the fuel gauge 33 when the engine E is running (step S3: step of detecting the fuel level). To be specific, the tilting detector 41 monitors the fuel amount calculated by the fuel amount calculator 40 based on the signal output from the fuel gauge 33. The tilting detector 41 determines that the body 2 of the watercraft 1 is tilted when the change amount of the signal output from the fuel gauge 33, i.e., the change amount per specified unit time of the fuel amount calculated by the fuel amount calculator 40 is the predetermined value or larger (step S4: step of determining whether or not the body 2 is tilted). Alternatively, in step S4, the tilting detector 41 may be configured to determine that the body 2 is tilted when the signal output from the fuel gauge 33 changes according to the predetermined pattern (see FIG. 5, FIG. 7, and FIG. 9).

When the tilting detector 41 detects that the body 2 is tilted in step S4, the engine controller 42 forcibly stops the engine E (step S5: step of stopping the engine E). Then, when the user resets the power supply switch 45 (turns on and then off) in step S6, the engine E can be started in response to the operation of the start-up input device 46 performed by the user (step S2). On the other hand, when the user does not reset the power supply switch 45 in step S6 but the change amount of the signal output from the fuel gauge 33 reaches the predetermined value or larger again, the tilting restoration detector 43 determines that the body 2 is returned from the tilted state to the untilted state (step of detecting that the body 2 of the watercraft 1 is returned from the tilted state to the untilted state), and the engine controller 42 enables the engine E to be started in response to the user's operation of the start-up input device 46 without resetting the power supply switch 45 (step S7: step of enabling start of the engine E). The step of detecting the fuel level, the step of determining whether or not the body 2 of the watercraft 1 is tilted, the step of stopping the engine E, the step of detecting that the body 2 is returned from the tilted state to the untilted state, and the step of enabling start of the engine E may be carried out by running programs stored in the ECU 25.

In the above described configuration, it can be determined whether or not the body 2 of the watercraft 1 is tilted by monitoring the signal output from the fuel gauge 33. So, the tilting sensor for exclusive use may be omitted. Therefore, the space which would be occupied by the tilting sensor can be efficiently used for other components. Furthermore, since the brackets or electric wires for the tilting sensor are omitted, the number of components and manufacturing cost of the watercraft 1 can be reduced. Moreover, the fuel gauge 33 is a float-type gauge and the direction of the gravitational force can be detected using the floats movable by the buoyant force. Therefore, even when the fuel tank 24 is filled with the fuel 100 at the full level, it can be determined whether or not the body 2 of the watercraft 1 is tilted.

Since the fuel gauge 33 for displaying the fuel amount in the fuel amount display section of the meter unit 26 is used to detect whether or not the body 2 of the watercraft 1 is tilted, the number of components and manufacturing cost of the watercraft 1 can be reduced. When the body 2 of the watercraft 1 is tilted and thereafter the user returns the body 2 to the untilted state, the user has only to operate the start-up input device 46 to start the engine E without resetting the power supply switch 45. This enables the user to start driving in a short time after the body 2 is tilted.

In an alternative, the tilting detector 41 may be configured to determine that the body 2 of the watercraft 1 is tilted when the fuel change amount is a predetermined value or larger, while the engine E is running or the watercraft 1 is driving. In this case, the fuel level change caused by supplying the fuel may be excluded from the conditions for determining whether or not the body 2 is tilted. In a further alternative, the tilting detector 41 may be configured to determine that the body 2 is tilted when the fuel level change amount is the predetermined value or larger and the value of the changed fuel level continues for a specified time. In this case, the fuel level change caused by factors other than the tilting of the body 2, such as rolling or pitching of the watercraft 1 or acceleration or deceleration of the watercraft 1, can be excluded from the conditions for determining whether or not the body 2 is tilted.

The fuel gauge 33 may be positioned in a center region in the lateral direction of the watercraft 1. This makes it possible to avoid false detection, for example, when the fuel gauge 33 detects that the fuel level change due to the rolling caused by waves is a fuel level change resulting from the tilting of the body 2 of the watercraft 1. As a result, tilting detecting precision can be improved. Or, the fuel gauge 33 may be positioned in a center region in the longitudinal direction of the watercraft 1. This makes it possible to avoid false detection that the fuel gauge 33 detects the fuel level change due to the pitching of the watercraft 1 caused by waves and acceleration or deceleration of the watercraft 1 is a fuel level change resulting from tilting of the body 2 of the watercraft 1. As a result, tilting detecting precision can be improved. Thus, the fuel gauge 33 is desirably positioned in the center region in the lateral or longitudinal direction of the watercraft 1.

Embodiment 2

Figure 11:
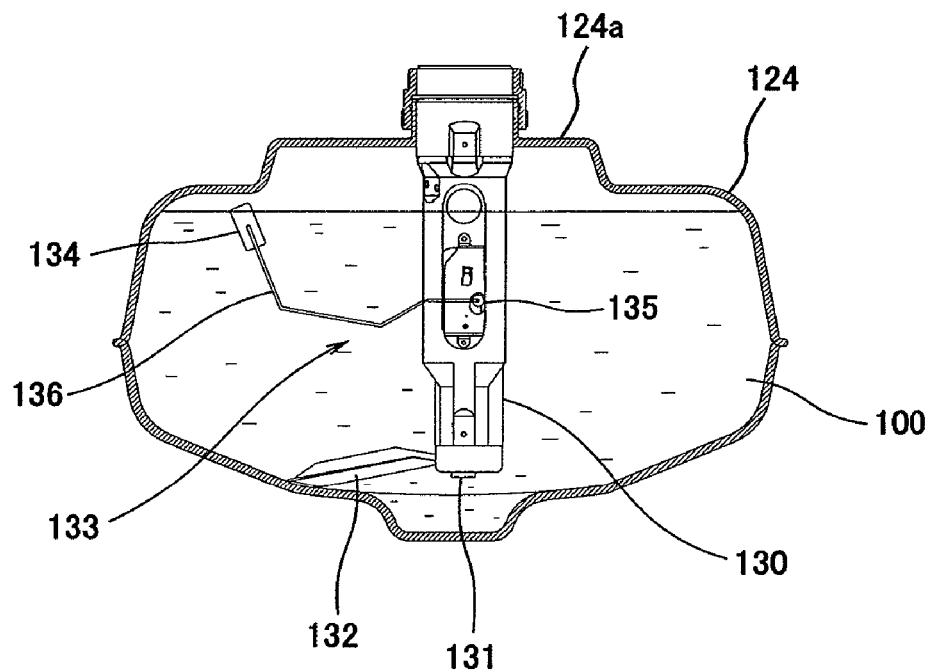
FIG. 11 is a cross-sectional view of a fuel tank in a jet-propulsion personal watercraft according to a second embodiment of the present invention.

FIG. 11 is a cross-sectional view of a fuel tank 124 in a jet-propulsion personal watercraft according to a second embodiment of the present invention. As shown in FIG. 11, a fuel pump 130 is attached to an upper wall portion 124a of the fuel tank 124. The fuel pump 130 extends downward inside the fuel tank 124. A suction port 131 is provided at a lower end portion of the fuel pump 130. A mesh-shaped filter 132 is attached to protrude from the suction port 131. The fuel pump 130 is attached with a fuel gauge 133. The fuel gauge 133 includes a pivot lever 136 which is oriented in the lateral direction of the watercraft 1 with one end portion thereof coupled to the fuel pump 130, a float 134 attached to an opposite end portion of the pivot lever 136, and a lever angle detector 135 which is a variable resistor which detects an angle change in the pivot lever 136. When the fuel tank 124 is tilted clockwise or counterclockwise, the float 134 moves according to the fuel level of the fuel 100 and the pivot lever 136 is pivoted. The lever angle detector 135 detects the angle change in the pivot lever 136 to detect the height position of the float 134. Thus, the fuel amount can be detected. The other configuration is identical to that of the first embodiment and will not be further described.

Figure 12:
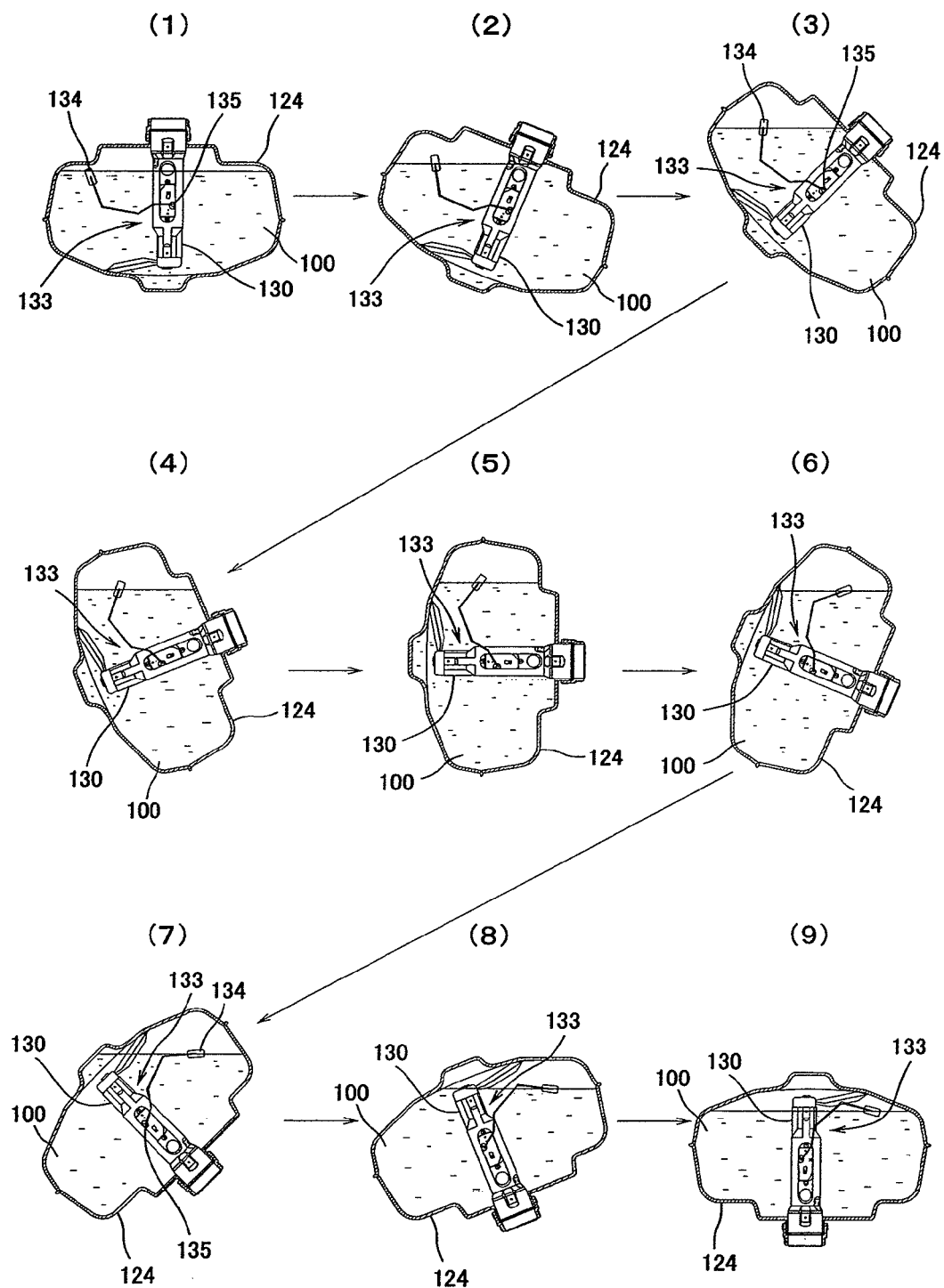
FIG. 12 is a cross-sectional view showing how the fuel tank which stores the fuel at a full level is moved when the body of the vehicle is tilted.
Figure 13:
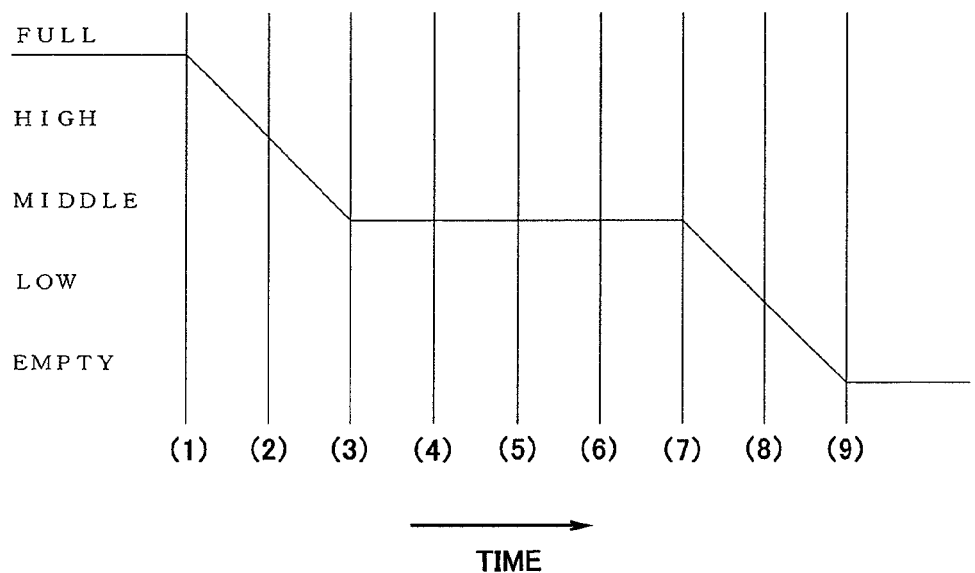
FIG. 13 is a graph showing a signal output from the fuel gauge when the body of the vehicle is tilted as shown in FIG. 12.

FIG. 12 is a cross-sectional view showing how the fuel tank 124 which stores the fuel 100 at the full level is moved when the body 2 of the watercraft 1 is tilted. FIG. 13 is a graph showing a signal output from the fuel gauge 133 when the body 2 is tilted as shown in FIG. 12. As shown in FIG. 12, when the body 2 of the watercraft 1 is tilted and inverted clockwise 180 degrees and the fuel tank 124 is rotated clockwise 180 degrees from a state (1) to a state (9), the fuel gauge 133 which is being tilted and inverted outputs a signal changing as shown in FIG. 13.

To be specific, in the state (1) to the state (3) in FIG. 12, the float 134 moves according to the change in fuel level of the fuel 100, and the lever angle detector 135 of the fuel gauge 133 outputs a signal changing from FULL to MIDDLE through HIGH. In the state (3) to the state (7) in FIG. 12, the lever angle detector 135 of the fuel gauge 133 continues to output the signal MIDDLE. Then, in the state (7) to the state (9) in FIG. 12, the float 134 moves according to the change in fuel level of the fuel 100, and the lever angle detector 135 of the fuel gauge 133 outputs a signal changing from MIDDLE to EMPTY through LOW. That is, when the body 2 of the watercraft 1 is tilted and inverted clockwise 180 degrees in the state where the fuel amount of the fuel 100 is at the full level, the fuel gauge 133 outputs the signal changing in four levels from FULL to EMPTY per specified unit time (e.g., five seconds).

Figure 14:
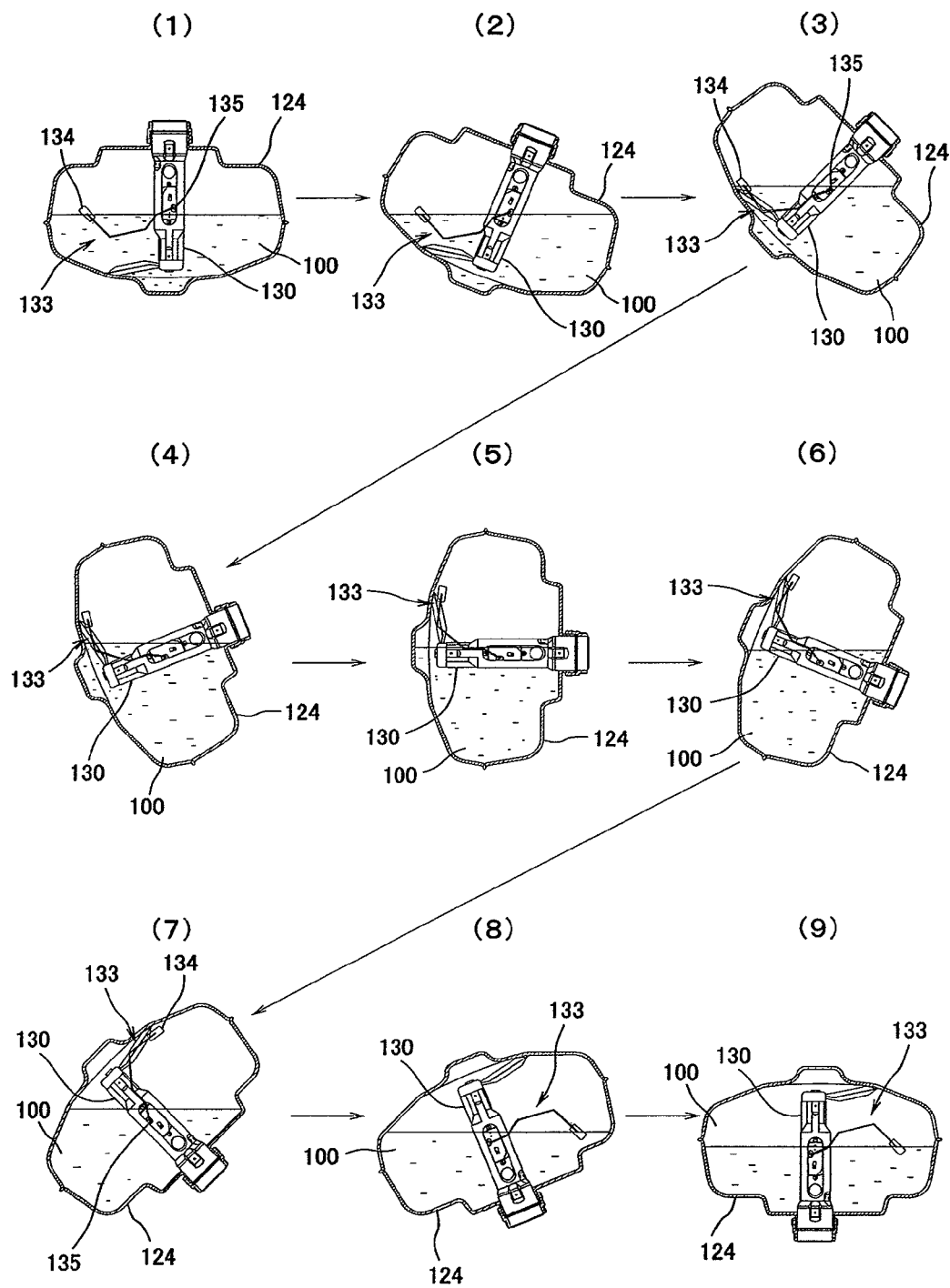
FIG. 14 is a cross-sectional view showing how the fuel tank which stores the fuel at a middle level is moved when the body of the vehicle is tilted.
Figure 15:
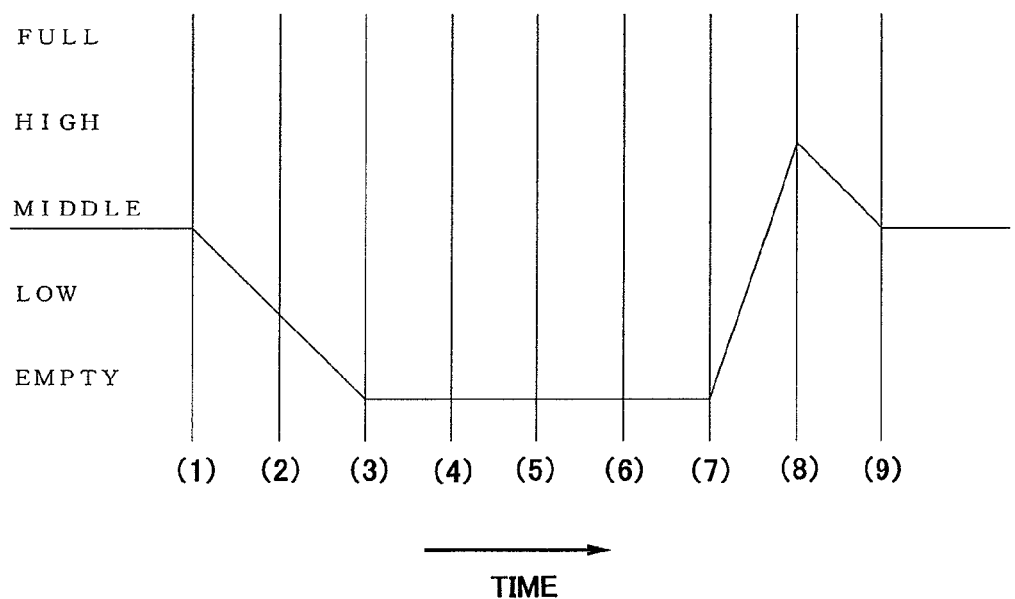
FIG. 15 is a graph showing a signal output from the fuel gauge when the body of the vehicle is tilted as shown in FIG. 14.

FIG. 14 is a cross-sectional view showing how the fuel tank 124 which stores the fuel at a middle level is moved when the body 2 of the watercraft 1 is tilted. FIG. 15 is a graph showing a signal output from the fuel gauge 133 when the body 2 of the watercraft 1 is tilted as shown in FIG. 14. As shown in FIG. 14, when the body 2 of the watercraft 1 is tilted and inverted clockwise 180 degrees and the fuel tank 124 is rotated clockwise 180 degrees, the fuel gauge 133 which is being tilted and inverted outputs a signal changing as shown in FIG. 15.

To be specific, in the state (1) to the state (3) in FIG. 14, the float 134 moves according to the change in fuel level of the fuel 100, and the lever angle detector 135 of the fuel gauge 133 outputs a signal changing from MIDDLE TO EMPTY through LOW. In the state (3) to the state (7) in FIG. 14, the lever angle detector 135 of the fuel gauge 133 continues to output the signal EMPTY indicating that the fuel amount of the fuel 100 is at the empty level, because the float 134 is outside the fuel 100 and does not change its position with respect to the fuel pump 130. Then, in the state (7) to the state (8) in FIG. 14, the float 134 moves downward by the gravitational force and reaches the fuel level of the fuel 100, and the lever angle detector 135 of the fuel gauge 133 outputs the signal HIGH indicating that the fuel amount of the fuel 100 is at the high level. Then, in the state (8) to the state (9) in FIG. 14, the float 134 moves according to the change in fuel level of the fuel 100, and the lever angle detector 135 of the fuel gauge 133 outputs the signal MIDDLE indicating that the fuel amount of the fuel 100 is at the middle level.

That is, when the body 2 of the watercraft 1 is tilted and inverted clockwise 180 degrees in the state where the fuel amount of the fuel level 100 is at the middle level, the fuel gauge 133 outputs the signal changing from MIDDLE to EMPTY, from EMPTY to HIGH, and then HIGH to MIDDLE per specified unit time (e.g., five seconds). That is, the fuel gauge 133 outputs the signal changing in three levels from EMPTY to HIGH.

Figure 16:
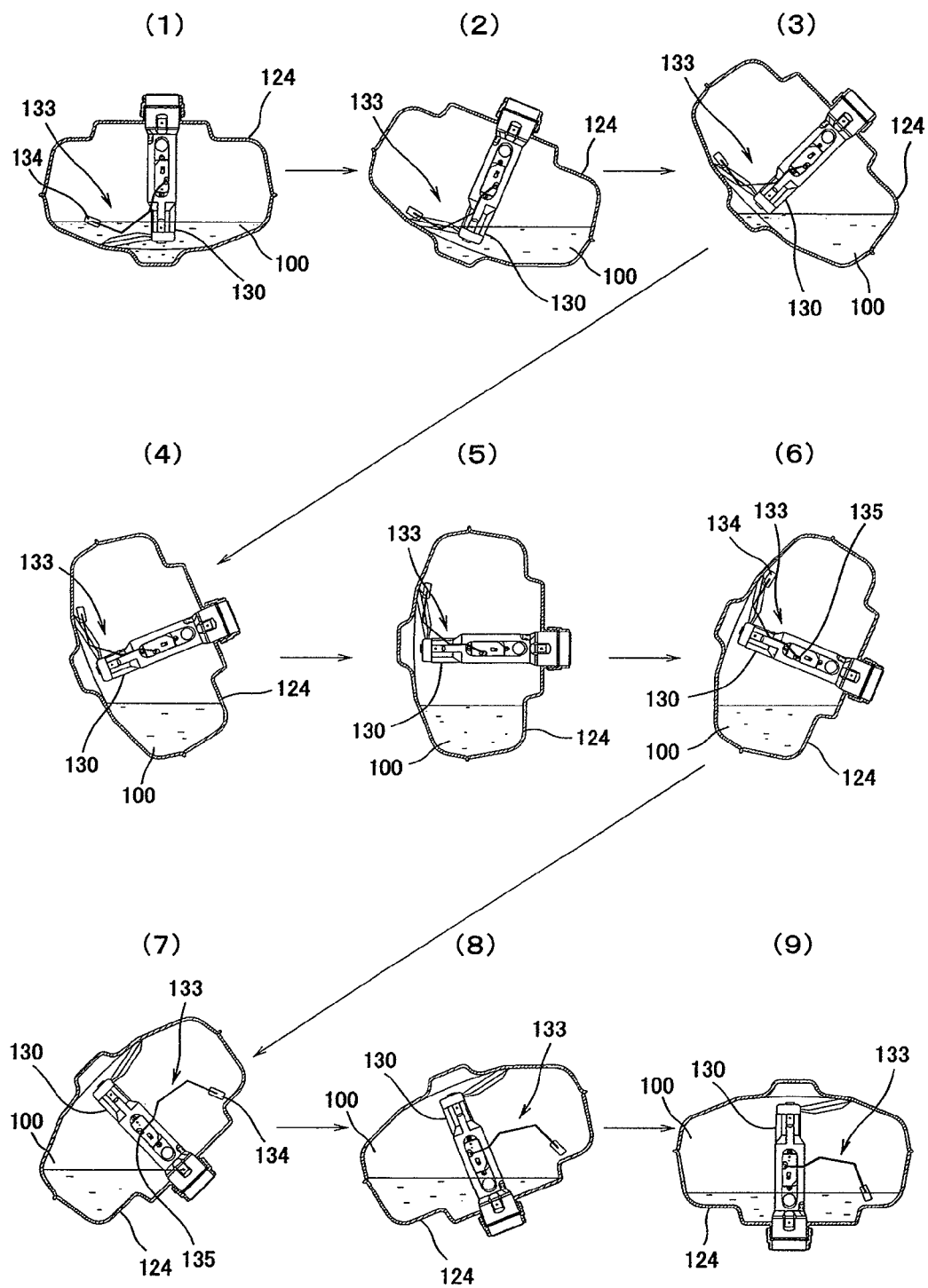
FIG. 16 is a cross-sectional view showing how the fuel tank in which a fuel amount is empty is moved when the body of the vehicle is tilted.
Figure 17:
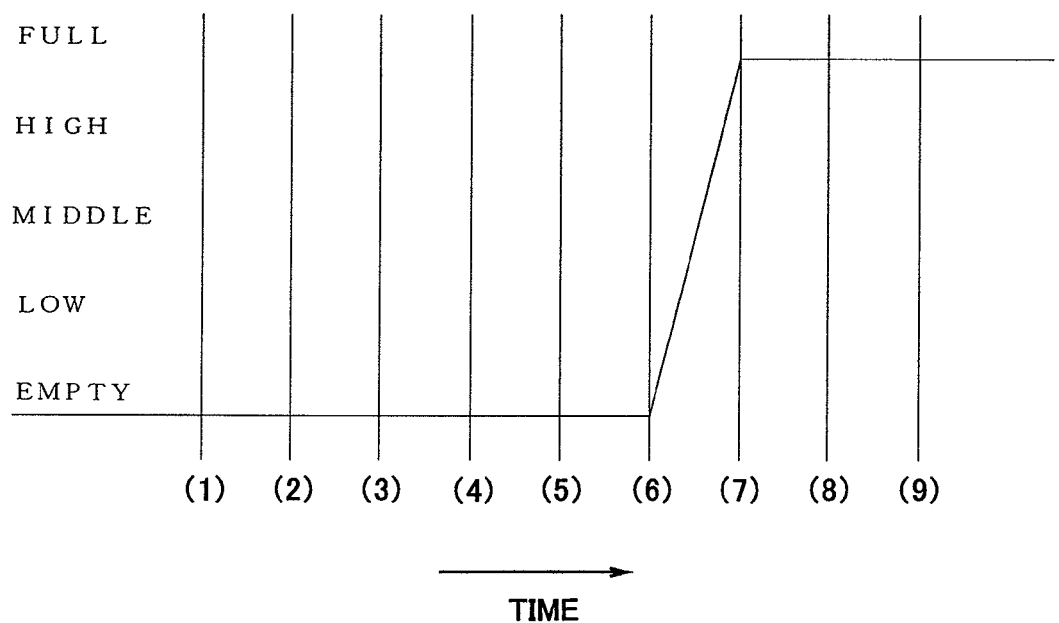
FIG. 17 is a graph showing a signal output from the fuel gauge when the body of the vehicle is tilted as shown in FIG. 16.

FIG. 16 is a cross-sectional view showing how the fuel tank 124, which stores the fuel 100 at the empty level, is moved when the body 2 of the watercraft 1 is tilted. FIG. 17 is a graph showing a signal output from the fuel gauge 133 when the body 2 of the watercraft 1 is tilted as shown in FIG. 16. As shown in FIG. 16, when the body 2 of the watercraft 1 is tilted and inverted clockwise 180 degrees and the fuel tank 124 is rotated clockwise 180 degrees from the state (1) to the state (9), the fuel gauge 133 which is being tilted and inverted outputs a signal changing as shown in FIG. 17.

To be specific, in the state (1) to the state (6) in FIG. 16, the float 134 is outside the fuel 100 and does not change its position with respect to the fuel pump 130, and the lever angle detector 135 of the fuel gauge 133 outputs the signal EMPTY indicating that the fuel amount of the fuel 100 is at the empty level. In the state (6) to the state (7) in FIG. 16, the float 134 moves downward by the gravitational force, and the lever angle detector 135 of the fuel gauge 133 outputs the signal FULL. Thereafter, the float 134 keeps the position with respect to the fuel pump 130, and the lever angle detector 135 of the fuel gauge 133 continues to output the signal FULL. That is, when the body 2 of the watercraft 1 is tilted and inverted clockwise 180 degrees in the state where the fuel amount of the fuel 100 is at the empty level, the fuel gauge 133 outputs the signal changing in four levels from EMPTY to FULL per specified unit time (e.g., five seconds).

As described above with reference to FIGS. 12 to 17, when the body 2 of the watercraft 1 is tilted and the fuel tank 124 changes its posture, the fuel level of the fuel 100 with respect to the fuel tank 24 changes significantly, and the signal output from the fuel gauge 133 changes significantly, unlike in a normal state. Therefore, when the change amount per specified unit time of the signal output from the fuel gauge 133 is the predetermined value or larger, for example, the change amount is three levels or larger in five levels, the tilting detector 41 determines that the body 2 of the watercraft 1 is tilted. In an alternative, the tilting detector 41 may determine that the body 2 is tilted when the signal output from the fuel gauge 133 changes according to the pattern shown in FIG. 12, FIG. 14 or FIG. 16.

In accordance with the above described configuration, it can be determined whether or not the body 2 of the watercraft 1 is tilted by monitoring the signal output from the fuel gauge 133. So, a tilting sensor for exclusive use may be omitted. Therefore, the space which would be occupied by the tilting sensor can be efficiently used for other components. Furthermore, since the brackets or electric wires for the tilting sensor are omitted, the number of components and manufacturing cost of the watercraft 1 can be reduced. Moreover, the change in the fuel level of the fuel 100 resulting from the tilting of the body 2 in the lateral direction can be precisely detected by detecting the fuel amount based on the angle of the pivot lever 136 coupled to the float 134, because the pivot lever 136 is oriented in the lateral direction which conforms to the direction in which the body 2 of the watercraft 1 is tilted.

Whereas in the above described embodiments, the jet-propulsion personal watercraft has been described, the present invention is applicable to other vehicles such as all terrain vehicles or motorcycles. Also, whereas in the above described embodiments, the body 2 of the vehicle 1 is tilted and inverted 180 degrees, the present invention is applicable to a case where the body 2 of the vehicle 1 is tilted 90 degrees. Furthermore, it may be detected that the vehicle 1 is tilted by detecting relative position change in a level of a liquid stored in an accommodating case other than the fuel tank 24 or 124, instead of using the change in relative position of the fuel level inside the fuel tank 24 or 124, as described in the above embodiments. Moreover, instead of the floats 35A to 35D, and 134, other suitable detecting means such as a laser may be used to detect the fuel level.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A vehicle comprising:
   an engine;
   a fuel tank configured to store a fuel supplied to the engine;
   a fuel gauge configured to detect a fuel level of the fuel inside the fuel tank;
   a tilting detector configured to determine, while the engine is running, whether or not a body of the vehicle is tilted, based on a signal output from the fuel gauge, wherein the tilting detector is configured to pre-store, for each fuel amount inside the fuel tank, different patterns indicating how the signal output from the fuel gauge changes with time when the body of the vehicle is tilted, and configured to determine that the body is tilted, when the signal output from the fuel gauge changes according to a pattern corresponding to the fuel amount inside the fuel tank; and
   an engine controller configured to stop the engine when the tilting detector detects that the body of the vehicle is tilted.

2. The vehicle according to claim 1,
wherein the fuel gauge includes a float disposed inside the fuel tank and a float movement detector configured to be able to detect a movement or position of the float.

3. The vehicle according to claim 2,
wherein the float movement detector includes a pivot lever coupled to the float and a lever angle detector configured to detect an angle of the pivot lever; and
wherein the pivot lever is oriented in a lateral direction of the vehicle.

4. The vehicle according to claim 1, further comprising:
a fuel amount display device configured to display the fuel amount of the fuel;
wherein the fuel gauge is configured to output to the fuel amount display device a signal indicating the fuel level of the fuel as fuel amount information.

5. The vehicle according to claim 1, further comprising:
a tilting restoration detector configured to detect that the body of the vehicle is returned from a tilted state to an untilted state, based on the signal output from the fuel gauge;
wherein the engine controller is configured to enable the engine to be started, when the tilting restoration detector detects that the body of the vehicle is returned from the tilted state to the untilted state.

6. The vehicle according to claim 1, further comprising:
a power supply switch which is operated by a user to supply an electric power to the engine controller;
a start-up input device which is operated by the user to start the engine; and
a tilting restoration detector configured to detect whether the body of the vehicle is returned from a tilted state to an untilted state, based on the signal output from the fuel gauge;
wherein the engine controller is further configured to not start the engine after the engine is stopped and when the tilting restoration detector continues to detect that the body is tilted unless the start-up input device is operated by the user after the power supply switch is reset; and
wherein the engine controller is configured to enable the engine to be started in response to the operation of the start-up input device performed by the user without resetting the power supply switch, when the tilting restoration detector detects that the body of the vehicle is returned from the tilted state to the untilted state.

\* \* \* \* \*